Dec. 27, 1955     K. E. THORP ET AL     2,728,641
TEMPERATURE-RESPONSIVE DECANTING CONTROL
Filed April 30, 1952

INVENTORS:
Kenneth E. Thorp
Lawrence W. Harms
BY Everett A. Johnson
ATTORNEY

United States Patent Office

2,728,641
Patented Dec. 27, 1955

2,728,641
TEMPERATURE-RESPONSIVE DECANTING CONTROL

Kenneth E. Thorp, Lansing, Ill., and Lawrence W. Harms, Hammond, Ind., assignors to Standard Oil Company, Chicago, Ill., a corporation of Indiana Application April 30, 1952, Serial No. 285,182

7 Claims. (Cl. 23—288)

This invention relates to an improved method and means for the control of fluids from a settler. More specifically it pertains to an improved method and means for avoiding the return of an excessive amount of slurry oil containing catalyst to a fluid catalytic cracking operation.

In fluid catalytic cracking systems employing solid catalyst of small particle size, some catalyst particles are carried overhead from the reactor to a point near the base of a main fractionator or scrubber tower wherein such solid particles are scrubbed out of the partially condensed product stream by slurry oil components thereof. The slurry oil containing solid catalyst particles leaves the base of the scrubbing zone of the fractionator at a temperature of about 675° to 725° F. This hot slurry is then cooled by heat exchange with incoming charging stock, and is returned to a higher level in the fractionator (in the upper part of the scrubbing zone) for effecting partial condensation of reactor effluent and removing solids therefrom. Another portion of the slurry from the base of the fractionator scrubbing zone is sent to a settling zone in order to remove as much as possible of the slurry oil from the solids before the solids are returned to the catalytic cracking system. The slurry oil is undesirable as a component of the cracking charging stock because it consists predominantly of polycyclic aromatics which tend to form excessively large amounts of coke on the catalyst when contacted therewith under cracking conditions.

To avoid the undesirable catalyst deposits, it is desired to return no more of the slurry oil than necessary to carry the catalyst back to the catalytic cracking operation. On the other hand it is necessary to have sufficient liquid vehicle for the catalyst to avoid plugging of the catalyst return line. Accordingly, it is an object of this invention to reduce to a minimum the amount of slurry oil returned with the finely divided solid catalyst to the cracking operation and yet maintain sufficient dilution to avoid plugging the return line upstream from the pump. To maintain sufficient dilution, heavy cycle gas oil may be added. The heavy cycle gas oil has a much lower coke forming tendency than the slurry oil. Also, in separating immiscible liquids from each other in a settler type apparatus, it is desirable to withdraw the one liquid with a minimum of the other liquid. It is therefore a further object of our invention to provide a method and means for pumping away only a small percentage of the upper liquid along with the bottom liquid. These and other objects of the invention will become apparent as the description of our invention proceeds.

Briefly, by our invention we provide an arrangement of apparatus such that the flow of concentrated slurry from the settler is controlled in response to the temperature of the concentrated slurry. To reduce to a minimum the amount of slurry oil returned with catalyst to the cracking operation and yet maintain sufficient dilution to avoid plugging the line upstream from the pump, the temperature of the concentrated slurry is used to regulate the speed of the pump.

In addition, correlated with catalyst concentration, we add an appreciable amount of heavy cycle gas oil to the concentrated slurry from the settler on the suction side of a pump. If necessary, this can be a variable quantity; and made to correspond with the quantity of the total mixture returned to the reactor. The addition of heavy cycle gas oil also makes it possible for the pump to operate at a normal rate, thereby reducing the amount of slurry oil pumped with the concentrated slurry to a minimum; and at the same time keeping the catalyst content of the mixture pumped at a desirable concentration.

A temperature recorder controller installed in the line on the suction side of the pump upstream from the addition of heavy cycle gas oil may control the pump rate. In this operation the pump rate is based on a preset temperature of the concentrated slurry determined experimentally as corresponding to the minimum amount of slurry oil with the catalyst that can be tolerated and still avoid line plugging. In one installation the temperature of the concentrated slurry being pumped was maintained at about 500° to 530° F. (corresponding to about one-half pound of catalyst per gallon of slurry oil in the concentrated slurry) and line plugging is avoided. The greater the amount of concentrated slurry that is pumped the higher will the temperature be.

An important feature of the invention is that of replacing some slurry oil with heavy cycle gas oil so that the deposits on the catalyst resulting from recycled slurry oil is reduced to a minimum. This dilution can be automatic indirectly in response to the temperature of the concentrated slurry at a variable pumping rate; by providing a ratio flow controller on the heavy cycle gas oil, which obtains its impulse from the venturi flow controller on the pump discharge.

The actual quantity of solids in the slurry oil in the base of the fractionator may vary throughout a relatively wide range, depending upon the efficiency of the cyclone separators in the upper part of the reactor of the fluid catalytic cracking system. Usually the amount of solids carried by the slurry oil when introduced into the slurry settler is in the range of 0.1 to 1.0 pound per gallon or from about 4 to 42 pounds per barrel, such particles being activated clay, synthetic silica alumina or silica magnesia catalysts having a particle size in the range of about 1 to 60 microns. The net amount of slurry continuously produced is passed to a settling zone (e. g. a slurry settler), so that as much as possible of the slurry oil may be decanted therefrom and the catalyst particles may be returned to the catalytic cracking system with a minimum amount of such slurry oil.

The invention will be more clearly understood from the following detailed description of a specific example thereof as applied to a 30,000 barrel per day fluid catalytic cracking unit. Since units of this type are well known to those skilled in the art, this description will be limited to the fractionation and slurry-decanting section thereof as illustrated in the accompanying drawings wherein we have shown a schematic flow diagram illustrating the settling of the slurry and the decanting of the undesirable oil with the separate recycle of the concentrated slurry.

The vapor mixture of reaction products and catalyst is introduced into the fractionator 12 by line 10 at a low point in the scrubbing section 11. In the base 15 of the fractionator 12 there accumulates a slurry of oil and catalyst, a portion of which is withdrawn by valved line 16 and passed by pump 17 into the settler 13. The decanted oil product accumulates in an upper portion of the settler 13 and is withdrawn through line 19 and discharged by pump 18 to storage or discard. The settler is provided with a balancing (vapor) line 14 which ties back into the baffle section in the bottom of the fractionator 12.

Another portion of the slurry of oil and catalyst, which accumulates in the base 15 of the fractionator 12, is withdrawn by valved line 40 and passed by pump 41 through heat exchangers 42, where it preheats the cold (fresh feed) charging stock; and then returns through line 33 to the bottom baffle section 11 in the fractionator 12, introducing it above the top baffles. The cooling action of the preceding results in partial condensation of the reactor effluent, producing the liquid (oil) which accumulates in the bottom 15 of the fractionator 12.

The concentrated slurry is accumulated in the lower portion 13a of the settler. The concentrated slurry is removed from accumulator 13a via line 21 and pump 23. A venturi meter 22 on the discharge side of pump 23 actuates a flow recorder controller 26. A temperature recorder controller 24 indirectly controls the rate of pumping, i. e., the rate of withdrawal of concentrated slurry from the settler 13 by "resetting" the flow recorder controller 26. The flow recorder controller 26 directly controls the pump 23, by actuating a control valve 27 on the driver steam line to the pump.

It is desired to withdraw from the settler 13 by line 21 a minimum of slurry oil in the concentrated slurry. However, the concentrated slurry would tend to plug transfer line 21 if insufficient liquid hydrocarbon is present to sustain the concentrated slurry in a pumpable and flowable state. It will be understood that the greater the amount of slurry oil in the concentrated slurry that is pumped through line 21, the higher the temperature will be.

A temperature recorder controller 24 installed in line 21 on the suction side of the pump 23 is responsive to a preselected temperature in line 21, which has been determined as corresponding to the minimum amount of slurry oil which can be tolerated in line 21 and still avoid line plugging. For example, in a catalytic cracking system wherein the inlet temperature to the settler 13 is between about 675° and about 725° F. it was determined that the temperature of the concentrated slurry in line 21, corresponding to the minimum proportion of oil in the concentrated slurry could be in the range of 510° to 530° F. without causing plugging in line 21.

The proportion of solids in the concentrated slurry flowing in line 21 may be increased to the point where there is incipient plugging of the line. At a point on the suction line 21, as determined by the optimum catalyst content of the concentrated slurry, a quantity of heavy cycle gas oil, comprising a part of the heavy cycle gas oil product resulting from the cracking in the reactor, may be introduced by valved line 25, the valve in this line being controlled by a ratio flow recording controller 28, operating the control valve 29. The flow recording controller 26 supplies the impulse for varying the flow from the ratio flow recording controller 28. The amount of heavy cycle gas oil introduced by valved line 25 is in substantial amounts sufficient to maintain the fluidity of the concentrated slurry for handling by pump 23.

From the above apparatus it will be apparent that we have provided an integrated system adapted to minimizing the proportion of slurry oil in the withdrawn concentrated slurry stream. We have also provided automatic means for diluting the concentrated slurry in response to its consistency or concentration as indicated by a temperature measurement. Lastly, we have provided an automatic means which is responsive to the flow rate of the diluted concentrated slurry and which controls the pumping rate of the mixture of the introduced heavy cycle gas oil and recovered concentrated slurry.

Although we have described our invention with particular reference to a liquid-solids separator, it should be understood that the techniques are also applicable to the separation of immiscible liquids. In such a modified system some other stream characteristics of the withdrawn material may be substituted for the temperature measurement if desired. Likewise, the blending of a second liquid may be controlled by such substitute stream characteristic. For example, the system may be used for the separation of chilled wax slurries or of a wax-rich stream with the introduction of a wax solvent or slurrying medium.

It should be understood, therefore, that the description of the specific apparatus and materials treated are by way of illustration only and that it is not intended that the invention be limited thereto, since modifications can be made in the method and apparatus by those skilled in the art in view of this disclosure.

We claim:

1. Apparatus for decanting oil from an oil-catalyst slurry and for recovering a concentrated catalyst slurry which comprises in combination a vertically elongated settling chamber, a means for introducing a hot catalyst-oil slurry into a midpoint of said chamber, means for withdrawing an oil stream of diminished catalyst content from an upper part of said chamber, conduit means for transporting concentrated catalyst-oil slurry from the bottom of said chamber, a pump on said conduit, and a temperature-responsive controller on said conduit on the suction side of said pump, said controller being adapted to regulate the said pump to maintain a pre-selected temperature in said conduit.

2. Apparatus for decanting oil from an oil-catalyst slurry and for recovering a concentrated catalyst slurry containing a minimum proportion of oil therein, which comprises in combination a vertically elongated settler, a means for introducing a catalyst-oil slurry into a midpoint of said settler, means for withdrawing an oil stream of diminished catalyst content from an upper part of said settler, conduit means for transporting concentrated catalyst-oil slurry from a lower part of said settler, the temperature of said slurry varies with the proportion of oil therein, a pump on said conduit, a flow-responsive means on the discharge conduit of said pump, and a temperature-responsive controller on said conduit on the suction side of said pump, said temperature-responsive controller and said flow-responsive means being adapted to regulate the pumping rate of said pump.

3. An apparatus for decanting oil from an oil-catalyst slurry and for recovering a concentrate which comprises in combination a first separation chamber, means for introducing a reactor effluent stream of oil and catalyst into first separation chamber, a first conduit means for withdrawing a portion of the dilute slurry of catalyst in oil from said separation chamber, a heat exchanger means on said first conduit means, and means for returning said first portion of the slurry to said first separation chamber at a point above the introduction of said reactor effluent, a second conduit means for withdrawing a dilute slurry of catalyst in oil from said separation chamber, means for recovering a heavy cycle oil fraction from said separation chamber, a vertically elongated settling chamber, conduit means for introducing said catalyst-oil slurry into said settling chamber at approximately mid-point thereof, means for withdrawing an oil stream of diminished catalyst continually from an upper part of said settling chamber, conduit means extending between the top of said settling chamber and discharging into the said first separation chamber at a point below the level at which the cooled slurry is recycled to said separation chamber, conduit means for transporting concentrated catalyst-oil slurry from the bottom of said settling chamber, a steam propelled pump on said conduit, a temperature-responsive controller on the suction side of said pump, a flow-responsive controller on the discharge side of said pump, a valved conduit means connected to the suction side of said pump downstream from said temperature controller, said valved conduit means being adapted to introduce heavy cycle oil from said first separation chamber, said temperature-responsive controller controlling the pumping rate of said pump, and a ratio flow-responsive controller means on said valved line actuated in response to the rate of flow in the discharge line from said pump.

4. An apparatus for decanting oil from an oil-catalyst slurry wherein a dilute oil slurry is subjected to settling and separate streams of catalyst-free oil and of concentrated oil slurry are withdrawn from a settling chamber, the improvement which comprises means for transporting a slurry from the settling chamber at a controlled rate for minimum withdrawal of oil with the catalyst while maintaining sufficient fluidity to facilitate pumping, said means including a conduit, a constant displacement pump on said conduit, a valved conduit means connected to the suction side of said pump, a temperature-responsive controller on said conduit upstream from said valved conduit means, means for controlling the rate of said pump in accordance with said temperature-responsive controller means, a flow-responsive means on said conduit downstream of said pump, and ratio flow-responsive controller means controlling the said valved conduit means in response to the flow through said pump as detected by said flow-responsive means.

5. The method of decanting oil from a catalyst-oil slurry and for transporting a minimum of undecanted oil with the concentrated slurry which comprises the steps of flowing a stream of catalyst-oil slurry at a temperature of between about 625° and about 725° F. into a separation zone, effecting a concentration in said catalyst-oil slurry by gravity separation, decanting the hot superposed oil of decreased catalyst concentration from an upper part of said separation zone, withdrawing a concentrated catalyst-oil slurry from a lower part of said separation zone, pumping the said concentrated slurry in a confined stream from said separation zone, and controlling the rate of said pumping so as to maintain the stream at a temperature of between about 510° and 530° F. such temperature assuring a proportion of oil in the slurry sufficient to retain it pumpable, the rate of pumping being decreased with any increase in temperature beyond this range until a temperature corresponding to the desired oil content of the slurry is restored.

6. In a system for decanting oil from a solid catalyst-oil slurry wherein the oil slurry is subjected to settling and separate streams of catalyst-free oil and a concentrated catalyst slurry is recovered, the improvement which comprises means for pumping the concentrated slurry from a settling chamber at a rate adapted to withdraw a minimum proportion of oil with the solid catalyst, and temperature-responsive means for controlling the pumping rate in response to the temperature of the concentrated oil-catalyst slurry withdrawn from the settling chamber.

7. A system for decanting oil from a catalyst-oil slurry and for transporting a minimum of undecanted oil with the concentrated slurry which comprises in combination, means for increasing the catalyst concentration in a portion of the oil slurry by a gravity separation, means for decanting the superposed oil, means for withdrawing a concentrated catalyst-oil slurry from the separation means, means for measuring the temperature of the withdrawn concentrated slurry as an indication of the proportion of oil in the slurry, means for pumping in response to said measured temperature, the rate of pumping being decreased with an increase in temperature until a temperature corresponding to the allowable oil content of the slurry is obtained.

References Cited in the file of this patent

UNITED STATES PATENTS

| 507,621   | Johnson  | Oct. 31, 1893  |
| 825,807   | Clarke   | July 10, 1906  |
| 1,720,231 | Newcomb  | July 9, 1929   |
| 2,236,035 | Luhrs    | Mar. 25, 1941  |
| 2,312,112 | McNealy  | Feb. 23, 1943  |
| 2,373,888 | Hachmuth | Apr. 17, 1945  |
| 2,424,147 | Campbell | July 15, 1947  |
| 2,447,149 | Wier     | Aug. 17, 1948  |
| 2,475,343 | Wellman  | July 5, 1949   |

OTHER REFERENCES

Tivy: Oil and Gas J., November 25, 1948, pp. 85–7, 89.